United States Patent
Kulkarni et al.

(10) Patent No.: US 10,979,369 B1
(45) Date of Patent: Apr. 13, 2021

(54) SYSTEMS AND METHODS FOR UPDATING CREATIVES GENERATION MODELS

(71) Applicant: Capital One Services, LLC, McLean, VA (US)

(72) Inventors: Kirankumar Kulkarni, McKinney, TX (US); Savio Joseph Darivemula, Plano, TX (US); Anil Konduru, Plano, TX (US); Gunjan Patel, Frisco, TX (US); Jie Shen, Plano, TX (US); Kelly L. Birch, Dallas, TX (US); Patrick James Manion, Richardson, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/808,935

(22) Filed: Mar. 4, 2020

(51) Int. Cl.
*H04L 12/58* (2006.01)
*H04L 12/26* (2006.01)
*G06F 15/16* (2006.01)
*G06N 5/04* (2006.01)
(Continued)

(52) U.S. Cl.
CPC .......... *H04L 51/02* (2013.01); *G06F 16/9535* (2019.01); *G06N 5/04* (2013.01); *G06N 20/00* (2019.01)

(58) Field of Classification Search
CPC ..... G06Q 10/107; H04L 12/585; H04L 12/58; H04L 12/581; H04L 29/08072; H04L 29/06; H04L 29/08756; H04L 29/0809; H04L 29/06068; H04L 51/02; G06N 5/04; G06F 16/9536
See application file for complete search history.

(56) References Cited

U.S. PATENT DOCUMENTS

| 10,200,321 B2* | 2/2019 | Brezina ............... G06F 16/9535 |
| 10,535,071 B2* | 1/2020 | Sehrawat ............... G06N 5/003 |

(Continued)

OTHER PUBLICATIONS

Surmenok, Contextual Bandits and Reinforcement Learning, *Towards Data Science*, Aug. 26, 2017. Retrieved from the Internet URL: https://towardsdatascience.com/contextual-bandits-and-reinforcement-learning-6bdfeaece72a (7 pgs.).

*Primary Examiner* — Abdullahi E Salad
(74) *Attorney, Agent, or Firm* — Hunton Andrews Kurth LLP

(57) ABSTRACT

Disclosed embodiments provide systems and methods related to updating creatives generation models. The system may include at least one memory unit for storing instructions and at least one processor configured to execute the instructions to perform operations. The operations may include receiving a feedback indication concerning an email message sent to a target, the email message constructed using a first template and associated with a first context, the feedback indication including a recommendation identifier; updating, in response to receiving the feedback indication, a feedback value for the email message stored in a delay buffer; obtaining the updated feedback value upon satisfaction of a time delay condition; updating, using the updated feedback data and the recommendation identifier, a machine learning model configured to recommend templates based on contexts; and constructing and providing a second email message using a second template recommended by the updated machine learning model for a second context.

20 Claims, 13 Drawing Sheets

(51) Int. Cl.
*G06N 20/00* (2019.01)
*G06F 16/9535* (2019.01)

(56) References Cited

U.S. PATENT DOCUMENTS

| | | | |
|---|---|---|---|
| 2013/0159426 A1* | 6/2013 | Milic-Frayling | H04L 51/32 709/206 |
| 2013/0254299 A1* | 9/2013 | Burshtein | G06Q 10/107 709/206 |
| 2014/0143350 A1* | 5/2014 | Ortmann | G06Q 10/107 709/206 |
| 2016/0353268 A1* | 12/2016 | Senarath | H04W 4/24 |
| 2017/0280208 A1* | 9/2017 | Mishra | G06K 9/00718 |
| 2018/0046984 A1* | 2/2018 | Brophy | G06F 8/38 |
| 2018/0241711 A1* | 8/2018 | Snapir | G06Q 10/107 |
| 2019/0220767 A1* | 7/2019 | Vigoda | G06F 40/216 |

\* cited by examiner

BANK

| Web Channel | Email Channel | Text Channel |

⊙ Create Campaign  ○ Edit Campaign

CAMPAIGN NAME
AN-Bandit-BAU-Campaign-2020

TEST STRATEGY
Contextual

LEARNING RATE DECAY
0.99

FEEDBACK DELAY TIME(HH:MM)
3 | 0

FEEDBACK EXPIRY TIME(HH:MM)
48 | 0

INITIAL LEARNING RATE
0.01

Customer Data Attributes  [SEARCH]
- account characteristic 1 ⓘ
- account characteristic 2 ⓘ
- account characteristic 3 ⓘ
- account characteristic 4 ⓘ
- account characteristic 5 ⓘ
- account characteristic 6 ⓘ
- account characteristic 7 ⓘ

Contextual Parameters
- allTrdAvgBal x
- allTrdAvgMthAgeVal x
- autIn1BalAmt x

✓ Success
Published Successfully!! — 801

[Update Test]     [Create-Edit Test Call] — 802

| | |
|---|---|
| cpg | BAQ ✎ |
| lpVar2 | /prequalify ✎ |
| moduleInd3 | 2 ✎ |
| moduleInd2 | 2 ✎ |
| lpVar1 | NA ✎ |
| moduleInd1 | 2 ✎ |
| legalRev | 1218 ✎ |
| ctaVar2 | See If I Pre-qualify ✓ ✗ |
| lpVar3 | NA ✎ |
| moduleInd4 | 1 ✎ |
| lp | APS ✎ |
| moduleInd5 | 1 ✎ |
| from_email | Bank ✎ |
| templateId | 42168 ✎ |
| ctaVar4 | Get Started ✎ |

1302 — Update    Cancel — 1304

*FIG. 13*

SYSTEMS AND METHODS FOR UPDATING CREATIVES GENERATION MODELS

TECHNICAL FIELD

The present disclosure relates generally to machine learning systems and methods for selecting creatives, and more particularly to a specific selection architecture incorporating a contextual bandit and a delay buffer.

BACKGROUND

A contextual bandit is a machine learning model that can learn a policy for selecting an action given a context, based on rewards received from an environment. A contextual bandit may learn the policy iteratively by selecting an action given a context, receiving a reward, and updating the policy based on the reward. However, implementing a contextual bandit can be difficult in applications where rewards are not timely received, or where a correlation exists between the value of a reward and the timing or probability of receiving the reward (e.g., positive rewards are received immediately while negative rewards are received late or inconsistently). In such applications, contextual bandits may exhibit policy instability, as early positive feedback causes the contextual bandit to learn a policy that is not advantageous overall.

Furthermore, the mere incorporation of a contextual bandit into a real-world application may not work. A real-world application incorporating a contextual bandit must instead be architectured for stability and scalability, in addition to performance.

SUMMARY

The disclosed systems and methods concern a specific selection architecture incorporating a contextual bandit and a delay buffer. This architecture can be used to select creatives provided in a campaign, such as an email campaign.

The disclosed embodiments include a system for providing a creative. The system can include at least one memory unit for storing instructions and at least one processor configured to execute the instructions to perform operations. The operations may include receiving a feedback indication concerning an email message sent to a target, the email message constructed using a first template and associated with a first context, the feedback indication including a recommendation identifier. The operations can further include updating, in response to receiving the feedback indication, a feedback value for the email message stored in a delay buffer. The operations can further include obtaining the updated feedback value upon satisfaction of a time delay condition. The operations can further include updating, using the updated feedback data and the recommendation identifier, a machine learning model configured to recommend templates based on contexts. The operations can also include constructing and providing a second email message using a second template recommended by the updated machine learning model for a second context.

The disclosed embodiments include a system for generating a creative. The system can include at least one memory unit for storing instructions and at least one processor configured to execute the instructions to perform operations. The operations can include receiving a request to generate an email message, the request including an identifier of a machine learning model and an identifier of a target. The operations can further include retrieving, from at least one database, context information for the target, using the identifier of the target. The operations can further include applying at least a portion of the context information to the identified machine learning model to generate a template recommendation. The operations can further include constructing the email message using the template recommendation. The operations can further include storing a negative feedback value for the email message in a delay buffer with a delay time. The operations can further include providing the constructed email message.

The disclosed embodiments include a non-transitory computer readable medium containing instructions that, when executed by at least one processor of a system, cause the system to perform operations. The operations can include receiving a feedback indication concerning an email message sent to a target, the email message constructed using a first template and associated with a first context, the feedback data including a recommendation identifier. The operations can further include updating, in response to receiving the feedback indication, a feedback value for the email message stored in a delay buffer. The operations can further include obtaining the updated feedback value upon satisfaction of a time delay condition. The operations can further include updating, using the updated feedback data and the recommendation identifier, a machine learning model configured to recommend templates based on contexts. The operations can further include constructing and providing a second email message using a second template recommended by the updated machine learning model for a second context.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 8 depicts an exemplary interface for configuring a contextual bandit for use with an email campaign, consistent with disclosed embodiments.

FIG. 13 depicts an exemplary interface for modifying a value of a variable in a template associated with an email campaign, consistent with disclosed embodiments.

DETAILED DESCRIPTION

Figure 1:
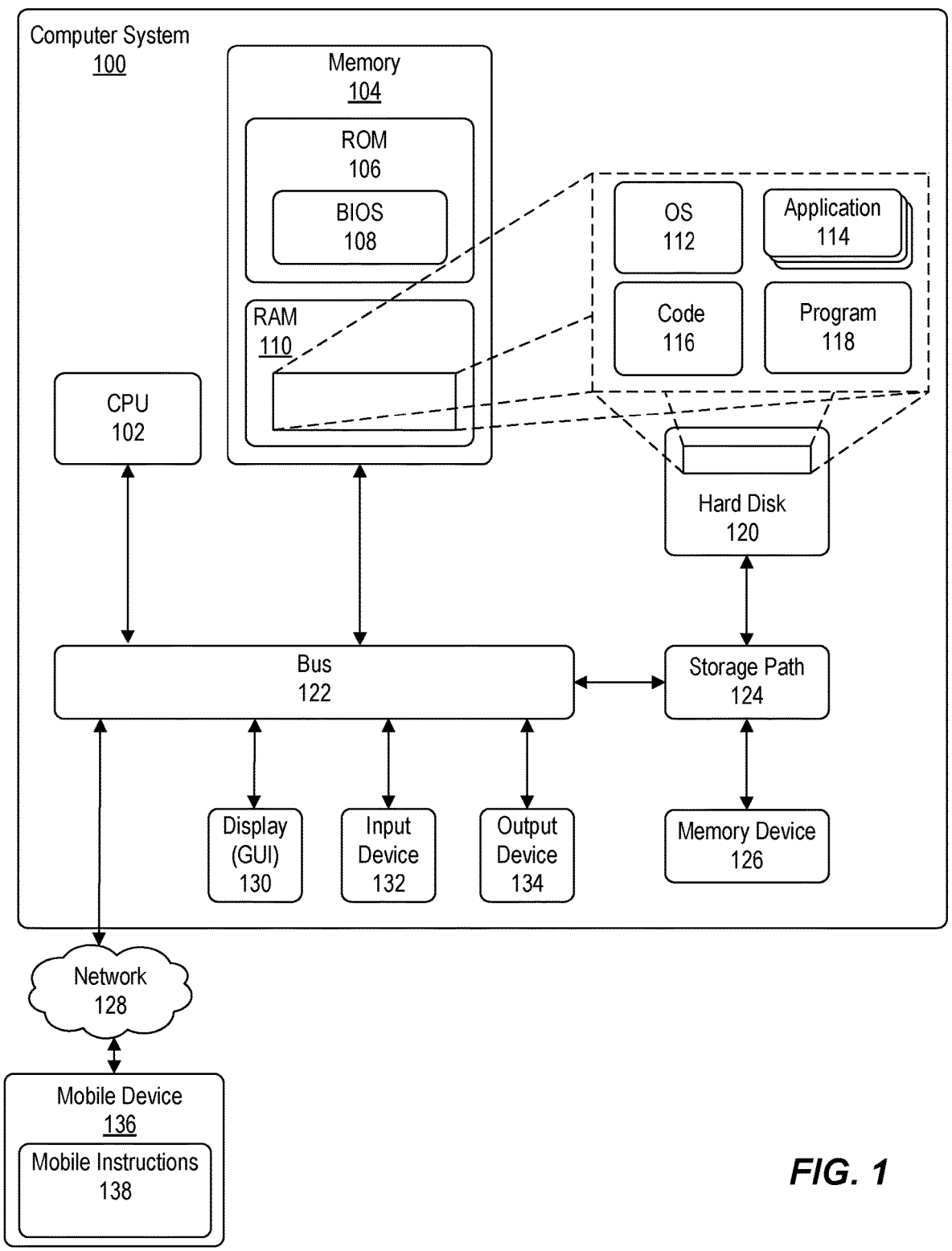
FIG. 1 depicts a block diagram of an exemplary computer system, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

The disclosed embodiments are directed to an email campaign system that uses a contextual bandit to generate email messages based on context. The system trains the contextual bandit using delayed feedback. As email messages are sent, the system associates each message with default feedback. The system may then update this default feedback in response to subsequent feedback indications concerning the message.

Certain implementations of contextual bandits update a policy based on a reward upon receipt of the reward. Actions are selected, given contexts, based on the current value of the policy. But such implementations may assume that when or whether a reward is received is uncorrelated with the value of the reward. When these assumptions are violated, the contextual bandit may be selecting current messages based on an incorrect policy. For example, an optimal action, given a context, may still generate negative feedback. If this feedback is received immediately, while positive feedback is delayed, the contextual bandit may (at least initially) undervalue this optimal action. Similarly, a sub-optimal action may still generate positive feedback. If this feedback is received immediately, while negative feedback is received later or not received at all, the contextual bandit may (at least initially) overvalue this sub-optimal action.

Some email campaigns violate the assumptions underlying conventional implementations of contextual bandits. For example, an email campaign may include between 1 and 10 million email messages, sent over the course of 1 to 10 days at rates of up to 50 to 500 email messages per second. Any positive feedback received may not be received for hours, while negative feedback may not be received at all. In such circumstances, a contextual bandit used to select the email messages may exhibit policy instability, as early positive feedback causes the contextual bandit to learn a policy that is not advantageous overall.

Furthermore, an email campaign system may need to select email messages at an extremely high rate (e.g., 50 to 500 email messages per second). As multiple email campaigns may be conducted simultaneously, the email system may need to run multiple contextual bandits simultaneously. These contextual bandits may be configured to select among differing sets of email templates based on differing contexts. Furthermore, once a template has been selected, the template must be personalized to a user. An email campaign system configured to use contextual bandits to generate email messages must be architectured to address these technical problems.

The disclosed embodiments address these technical problems by delaying the feedback used to train the contextual bandit and associating email messages with default feedback. The email campaign system further divides determination of the context, selection of the template, generation of the message, and obtaining and storing the feedback between multiple individually scalable microservices. These microservices can be implemented as containers (e.g., docker containers), which can be hosted by a cloud computing system (e.g., Amazon Web Services). In this manner, the email campaign system can be implemented in a scalable and stable manner, without sacrificing performance.

FIG. 1 depicts a block diagram of an exemplary computer system 100, consistent with disclosed embodiments. Components of system 100 may include a central processing unit (CPU) or processor 102, a memory unit 104, and a bus 122 that interconnects system components including memory 104 and CPU 102. Computer system 100 can include computer-readable media, such as volatile or nonvolatile computer storage media implemented in a method or technology suitable for storing computer-readable instructions, data structures, program modules, of the like (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other suitable medium).

Bus 122 can be a suitable type of bus structures, such as a memory bus or memory controller, a peripheral bus, and a local bus using a suitable bus architecture. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus—also known as Mezzanine bus.

Memory 104 can include computer-readable media, such as read only memory (ROM) 106 and random access memory (RAM) 110. A basic input/output system (BIOS) 108, containing the basic routines that help to transfer information between elements within computer system 100 is typically stored in ROM 106. Additionally, RAM 110 may contain operating system (OS) 112, applications 114, other code 116 that may be executed by one or more different programs, and program 118. RAM 110 typically contains data and/or program modules that are immediately accessible to and/or presently being operated on by CPU 102.

Hard disk drive 120 can be removable/non-removable and volatile/nonvolatile computer media. The hard disk drive 120 can read from or write to non-removable, nonvolatile magnetic media, and a memory device 126. Other removable/non-removable and volatile/nonvolatile computer storage media that can be used in exemplary computer system 100 include, but are not limited to, magnetic tape cassettes, flash memory cards, digital versatile disks, digital video tape, solid state RAM, and solid state ROM. The disks and their associated computer media, discussed above and illustrated in FIG. 1, provide storage of computer-readable instructions, programmable code, data structures, program modules and other data for computer system 100. In FIG. 1, hard disk 120 is illustrated as storing an operating system (OS) 112, one or more applications 114, other programmable code 116, and a program 118.

Storage path 124 can provide a physical space for bus 122 to connect hard disk drive 120 and memory device 126. Memory device 126 can be an optical disk drive or a magnetic disk drive that reads from or writes to a removable and nonvolatile storage medium such as an optical disk or magnetic disk.

A user can enter commands and information into computer system 100 through an input device 132 such as a keyboard and mouse, trackball or touch pad tablet, electronic digitizer, or microphone. Other input devices can include a joystick, game pad, satellite dish, and scanner. These and other input devices can be connected to CPU 102 through an input interface that is coupled to bus 122, or through other interfaces or bus structures, such as a parallel port, game port or a universal serial bus (USB). A display (GUI) 130 or other type of video device can also be connected to bus 122 via an interface, such as a video interface. In addition, an output device 134, such as speakers or a printer, can be connected to bus 122 through an output interface.

Computer system 100 can operate in a networked environment using a network 128 and a mobile device 136. Mobile device 126 can be used by an administrator, such as a marketing campaign developer, or a target as discussed herein. Computer system 100 can also include a personal computer, a server, a router, a network PC, a peer device or other common network node. Mobile device 136 can include a handheld, tablet, or client device. Network 128 depicted in FIG. 1 can include a local area network (LAN), a wide area network (WAN), or other type of network. Such networking environments are commonplace in offices, enterprise-wide computer networks, intranets, and the Internet. In a networked environment, programmable code and application programs can be stored in remote computers. By way of example, FIG. 1 illustrates mobile instructions 138 as residing on mobile device 136. It will be appreciated that the network connections shown are exemplary and other means of establishing communication between computers and mobile device 136 can be used.

Figure 2:
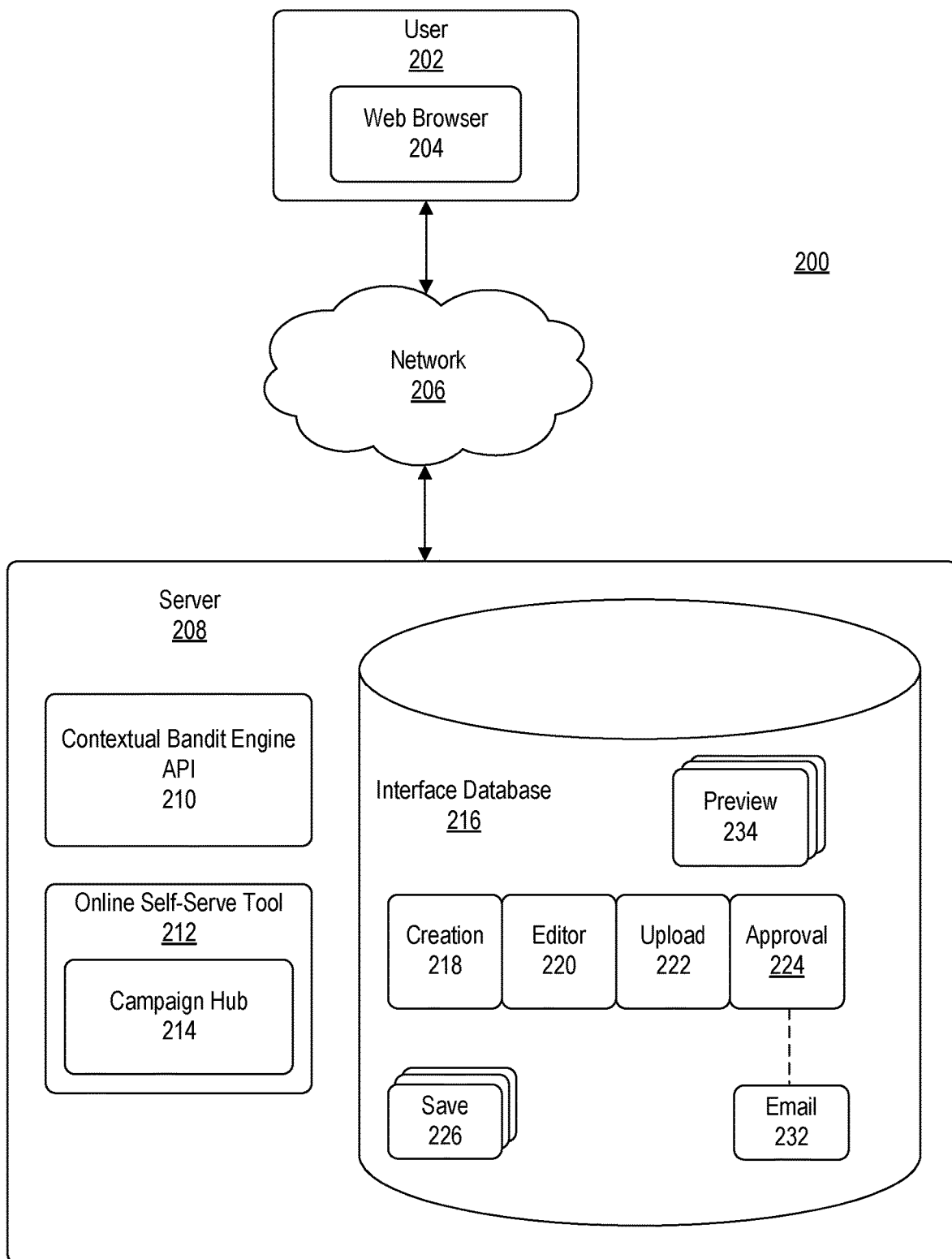
FIG. 2 depicts a logical diagram of an exemplary email campaign system, consistent with disclosed embodiments.

FIG. 2 depicts a logical diagram of an exemplary email campaign system, consistent with disclosed embodiments. In various embodiments, a user 202 operating computer system 100 or mobile device 136 can be operably coupled to one or more servers 208 by a network 206.

Network 206 can be a suitable network, such as a local area network (LAN), a wide area network (WAN), or other type of network. A web browser 204 can execute on computer 100 (as shown) or mobile device 136 (not shown), and web browser 204 can include functionality for receiving data entered by user 202 as part of a self-serve tool consisting of a plurality of graphical user interfaces (GUIs). In general, web browser 204 can be implemented using interpreted or executable software code such as a kernel component, an application program, a script, a linked library, an object with methods, and so forth. The particular implementation of web browser 204 is not intended to be limiting. Web browser 204 can be configured to display interfaces, such as the interfaces described herein, for interacting with the disclosed email campaign system. As would be appreciated by those of skill in the art, additional interfaces may also be used to interact with the disclosed email campaign system.

Server 208 can be a suitable computer system or computing device, such as computer system 100 of FIG. 1. In some instances, server 208 can be part of a cloud computing platform (e.g., Amazon Web Services, Microsoft Azure, or the like). In various instances, server 208 can be configured to host at least one of contextual bandit engine API 210, online self-serve tool 212, or interface database 216.

Interface database 216 can include a creation interface 218, an editor interface 220, an upload interface 222, and an approval interface 224. Approval interface 224 can include an email interface 232. Server 208 can transmit email interface 232 as an approval interface 224. Approval interface 224 may allow for a user to approve content before publishing of the content on a webpage.

Interface database 216 can also include multiple save interfaces 226 and multiple preview interfaces 234. Other interfaces (not shown) can be contemplated for display to user 202 and for interacting with online self-serve tool 212. Each of the interfaces and associated modules for displaying the interfaces can include suitable executable software code such as a kernel component, an application program, a linked library, an object with methods, or other type of executable software code.

User 202 can utilize one or more of the interfaces to create email templates. In combination with online self-serve tool 212, contextual bandit engine API 210 can select, given a context, an email template for generating an email message likely to result in favorable feedback to the email message.

Figure 3:
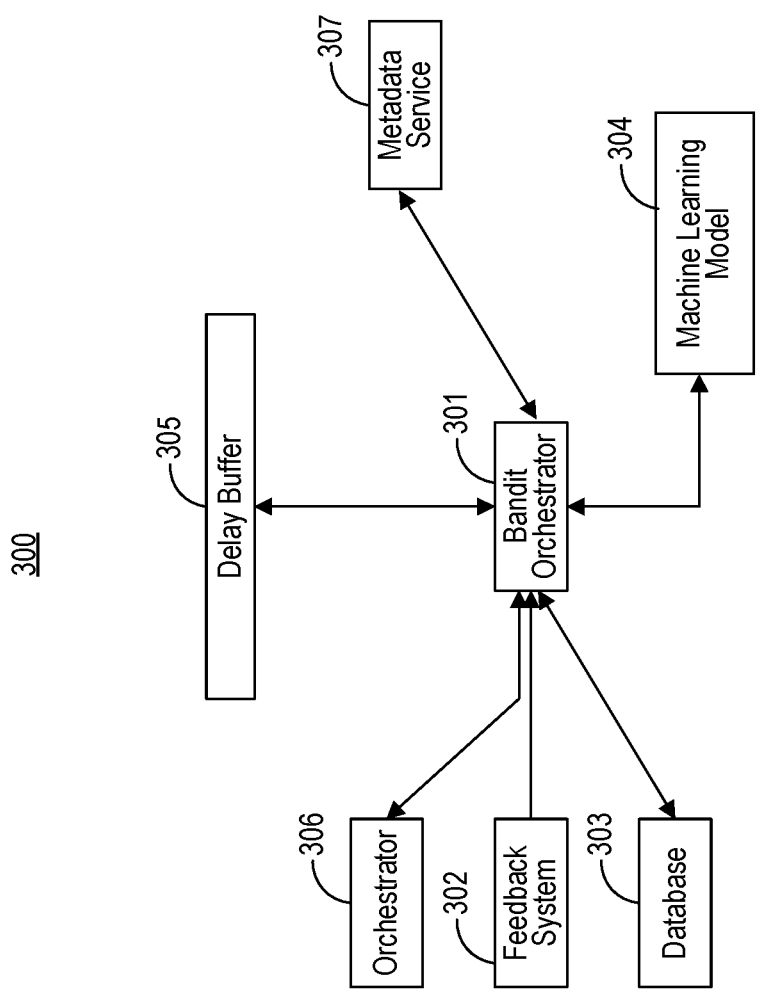
FIG. 3 depicts an exemplary microservices architecture for an email campaign system, consistent with disclosed embodiments.

FIG. 3 depicts an exemplary microservices architecture for an email campaign system 300, consistent with disclosed embodiments. System 300 can include a bandit orchestrator 301, a feedback system 302, a database 303, a machine learning model 304, a delay buffer 305, a system orchestrator 306, and a metadata service 307. System 300 can be configured to generate and provide personalized emails using templates selected by a contextual bandit. System 300 can also be configured to manage feedback and train the contextual bandit to better select templates. For example, system 300 can be configured to determine a context, choose an email template based on the context, generate an email message using the email template, and provide the email message to a target. In some embodiments, system 300 can be configured to generate and store default feedback, observe a feedback indication, and update the default feedback based on the feedback indication.

Bandit Orchestrator 301 can be configured to determine a context associated with a request to generate an email message, generate the email message, and manage feedback associated with email messages. Bandit Orchestrator 301 can also determine the context and generate the email message in response to a request received from system orchestrator 306. Determining a context for the request can include receiving feedback indication from feedback system 302, updating a feedback value in a delay buffer 305, obtaining the updated feedback value, updating a machine learning model 304, retrieving information from database 303, applying at least some of the retrieved information to the machine learning model 304, receiving a plurality of email templates from the machine learning model 304.

Feedback system 302 can be configured to obtain feedback indications concerning email messages. Feedback system 302 can transmit the obtained feedback indications to the bandit orchestrator 301. For example, feedback system 302 can monitor an email message sent to a target, obtain feedback indications if the target clicked a link in the email message, and transmit a feedback indication reflecting the click to a bandit orchestrator 301.

Database 303 can be configured to store information associated with targets (e.g., present, former, or potential clients or customers; or the like). The information can include personal information and interaction information. The personal information can include at least one of income information, financial account information, credit report information, or employment information. The personal information can further include demographic information in some embodiments. The interaction information can include information concerning previous interactions with an entity. For example, the previous interactions can include responses to prior marketing campaigns, product inquiries, etc.

Machine learning model 304 can be configured to recommend templates for email messages. Machine learning model 304 can be a contextual bandit model that increases a probability of recommending a template based on a context. The context can be information discussed above with respect to database 303. Machine learning model 304 can further store campaign definition information. The campaign definition information can specify the context associated with a contextual bandit. For example, the campaign definition information can indicate what items of information about a target (e.g., what items of personal information and interaction information) are part of the context for a particular contextual bandit.

Delay buffer 305 can be configured to store feedback data. Delay buffer 305 can be a distributed database storing data in multiple regions. The delay buffer 305 can be realized as a distributed database. For example, the distributed database can be realized in Redis, or another suitable system. Realizing the delay buffer as a distributed database can ensure that a failure of the delay buffer 305 in one region does not cause system 300 to lose accumulated feedback data.

In some embodiments, system 300 can transmit an email message constructed using a first template and associated with a first context to a target. The first context can include descriptive data for a first target and interaction data for the first target. For example, the descriptive data can represent, but not limited to, an age, a residence, a FICO score, and an income of a first target. When the email message is transmitted, bandit orchestrator 301 can store feedback data in delay buffer 305.

The stored feedback data can include a recommendation identifier. In some embodiments, the recommendation identifier can be a unique identifier suitable for associating the feedback data with the feedback indication. For example, machine learning model 304 can create the recommendation identifier when recommending a template for an email. In some embodiments, the recommendation identifier can be associated with the feedback indication (e.g., the recommendation identifier can be associated with the email, which can be associated with the feedback indication). In some embodiments, the stored feedback data can include an indication of the context used to select the email template, an indication of the email template used to generate the email, and a feedback value. In some embodiments, system 300 can be configured to initially include a negative feedback value in the stored feedback data. For example, bandit orchestrator 301 can store the feedback data in delay buffer 305, the feedback data including a negative feedback value, shortly after system 300 mails an email message (e.g., within a second, a minute, or tens of minutes).

The stored feedback data can also include a machine learning model identifier. The machine learning model identifier can identify a particular contextual bandit. The particular contextual bandit can be associated with a group of population comprising targets.

The stored feedback data can also include a delay time. The delay time can vary upon a context associated with an email message. For example, bandit orchestrator 301 can store in delay buffer 305 a time between 8 and 30 hours, or less than two days, or less than seven days as a delay time. The delay time can provide a time requirement for each stored feedback data to be stored in delay buffer 305. In other words, bandit orchestrator 301 cannot retrieve feedback data from the delay buffer 305 unless a delay time associated with the feedback data has elapsed since mailing of the email message. For example, if an email message is sent and stored at 8 A.M., with a 12-hour delay time, bandit orchestrator 301 cannot obtain feedback data associated with the email message from delay buffer 305 before 8 P.M.

Alternatively, the delay buffer 305 can be configured to provide the feedback data to another component of system 300 after a predetermined time. For example, the delay buffer 305 can be configured to automatically send a message including the feedback data a certain amount of time after receiving the feedback data. For example, the delay buffer can be configured to forward the feedback data to bandit orchestrator 301 after a certain amount of time. In some instances, the amount of time can be predetermined. Alternatively, the amount of time can depend on at least one of the contextual bandit, campaign, or creative.

System orchestrator 306 can be configured to transmit a request to generate an email message to bandit orchestrator 301. In some embodiments, system orchestrator 306 can be configured to receive a constructed email message from bandit orchestrator 301 and transmit the email message to a target. Metadata service 307 can be configured to store a set of email templates. Metadata service 307 can further transmit a plurality of email templates for an email message to bandit orchestrator 301.

In some embodiments, system 300 can be configured to maintain a context-email template data structure that tracks the rewards received in each context for each email template used. In some embodiments, the context-email template data structure can be maintained by machine learning model 304. The context-email template data structure can be specific to each contextual bandit. For example, the context-email template data structure can store an expected reward for each email template in each context. As a non-limiting example, machine learning model 304 can be configured to update this expected reward as follows:

$$R(\text{context}_k, \text{template}_j)_{i+1} = R(\text{context}_k, \text{template}_j)_i + \text{Update}_{i+1}$$

Where $R(\text{context}_k, \text{template}_j)_{i+1}$ is the value of the expected reward for template j in context k after update i+1, $R(\text{context}, \text{template}_j)_i$ is the value of the expected reward after update i, and $\text{Update}_{i+1}$ is the value of update i+1. As a further non-limiting example, system 300 can be configured to calculate the update as follows:

$$\text{Update}_{i+1} = a \times (R_{i+1} - R(\text{context}_k, \text{template}_j)_i)$$

Where $R_{i+1}$ is the reward received from the environment that prompts update i+1 and a is a scaling parameter taking values between zero and one. As a non-limiting example, $R_{i+1}$ may have a default value of 0, a value of −10 when a feedback indication indicates that a user has unsubscribed to a mailing list in response to an email, and a value of 1 when a feedback indication indicates that a user has clicked on a link in an email. The value of a may depend on the number of updates. For example, when a is the reciprocal of the number of updates, then $R(\text{context}_k, \text{template}_1)_{i+1}$ is the simple average of all rewards for template j in context k.

When a is a fixed number, $R(\text{context}_k, \text{template})_{i+1}$ will emphasize more recent rewards over earlier rewards.

The contextual bandit can be configured to select templates based on the expected rewards for the templates. In some embodiments, the contextual bandit can be configured to select either a template that maximizes an expected reward in a context or select a random template. For example, the contextual bandit can be configured to select a template that maximizes an expected reward in the context with probability p or select another action with probability p/(m−1), where m is the number of available templates. In various embodiments, the contextual bandit can be configured to select a template using a softmax function:

$$P(\text{context}_k, \text{template}_j) = e^{R(\text{context}_k, \text{template}_j)_{i+1}} / \sum_m e^{R(\text{context}_k, \text{template}_m)_{i+1}}$$

As would be appreciated by one of skill in the art, other updating formulas are possible, and the disclosed embodiments are not intended to be limited to this particular update method.

In some embodiments, one or more component of system 300 can be realized as a microservice. For example, at least one of bandit orchestrator 301, feedback system 302, database 303, machine learning model 304, orchestrator 306, or metadata service 307 can be implemented as a microservice.

Figure 4:
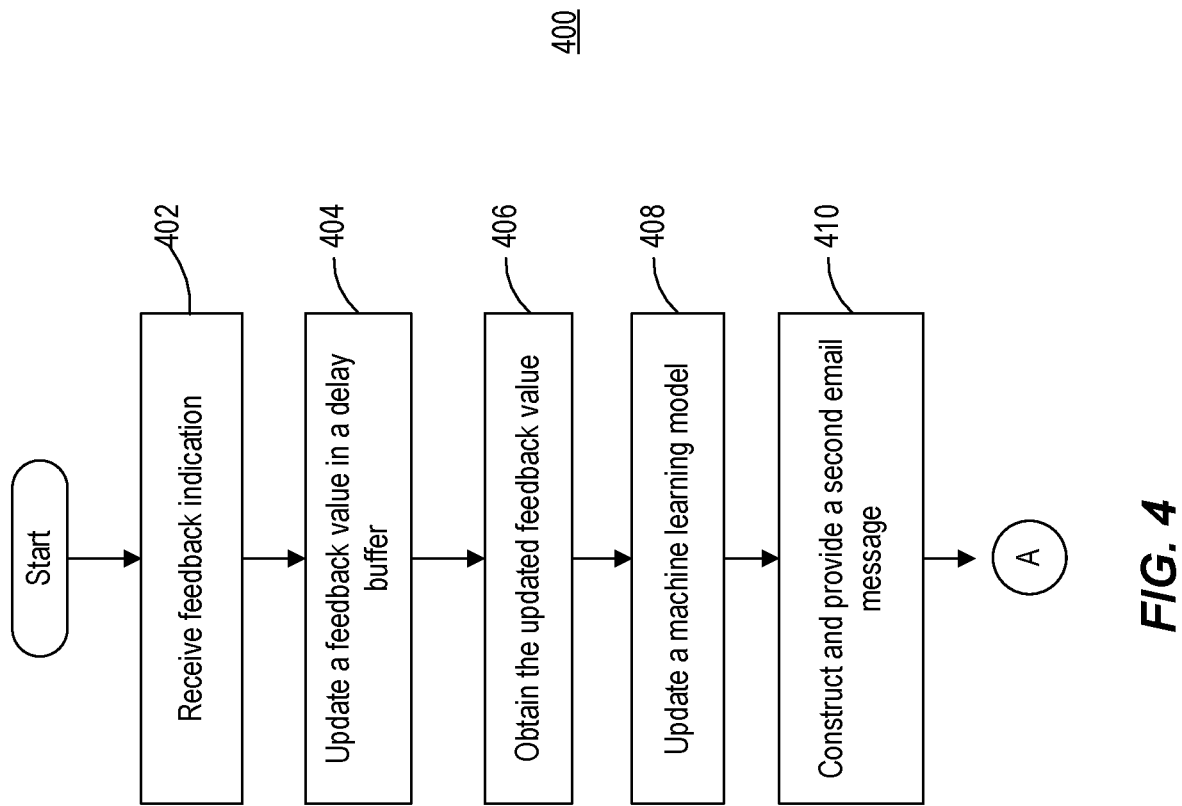
FIG. 4 depicts an exemplary flow chart illustrating an exemplary feedback process, consistent with disclosed embodiments.

FIG. 4 depicts an exemplary flow chart illustrating an exemplary feedback process 400, consistent with disclosed embodiments. In some embodiments, exemplary feedback process 400 can be executed by a bandit orchestrator 301.

In step 402, bandit orchestrator 301 can receive a feedback indication concerning an email message sent to a target (customer) from feedback system 302. The feedback indication can include a recommendation identifier associated with an email message. The feedback indication can indicate selection of a link in the email message. For example, feedback system 302 can transmit to the bandit orchestrator 301 a feedback indication that a link in an email message was selected.

In step 404, bandit orchestrator 301 can update a feedback value for feedback data stored in delay buffer 305. The stored feedback data can be identified using the recommendation identifier. For example, recommendation identifier received from feedback system 302 can be compared to recommendation identifiers included in stored feedback data. Bandit orchestrator 301 can change a stored negative feedback value associated with the stored feedback data to a positive feedback value. For example, bandit orchestrator 301 may change a stored negative feedback value associated with a stored feedback data to a positive value in delay buffer 305 when bandit orchestrator 301 received a feedback indication associated with the stored feedback data from feedback system 302. By way of further example, if bandit orchestrator 301 did not receive a feedback indication associated with a stored feedback data from feedback system 302, bandit orchestrator 301 may not modify a negative feedback value associated with the stored feedback data in delay buffer 305.

In some embodiments, bandit orchestrator 301 can change the stored negative feedback value by providing instructions to delay buffer 305. In various embodiments, bandit orchestrator 301 can be configured to provide a new message including a positive feedback value to delay buffer 305. The disclosed embodiments are not intended to be limited to a particular manner of changing the stored negative feedback value.

In step 406, bandit orchestrator 301 can obtain a feedback value from delay buffer 305 upon satisfaction of a time delay condition. In some embodiments, a time delay associated with a feedback data is stored in delay buffer 305. Bandit orchestrator 301 can be configured to obtain the feedback data, including the feedback value, when the time since mailing of an email message is greater than the stored time delay associated with the feedback data. For example, an email message can be sent at 8 AM and a feedback data associated with the email is stored in delay buffer 305 with a 12-hour time delay. Bandit orchestrator 301 can receive a feedback indication from feedback system 302 at 10 AM indicating that a link in the email was selected. Bandit orchestrator 301 may then change the feedback value associated with the stored feedback data. But bandit orchestrator 301 may not be configured to obtain the updated positive feedback value from the delay buffer 305 until 8 P.M. because a time requirement indicated by the time delay has not been satisfied. When the time delay is satisfied, bandit orchestrator 301 can obtain the positive feedback value. Alternatively, the delay buffer 305 can be configured to provide the feedback delay to bandit orchestrator 301 after 12 hours have elapsed from the time the feedback data was stored.

In step 408, bandit orchestrator 301 can update a machine learning model 304 using feedback data and a recommendation identifier obtained from the delay buffer 305. In some embodiments, the recommendation identifier can be used to determine the context and the recommended template. In various embodiments, bandit orchestrator 301 can be configured to provide to the machine learning model 304 at least one of an indication of the context, the recommended template, the recommendation identifier, or the contextual bandit that provided the recommendation. Bandit orchestrator 301 can update machine learning model 304 to increase a probability of recommending the template, given the context, when the feedback data includes a positive feedback value. As a non-limiting example, when an email including particular content and sent to a target in a particular age range is associated with positive feedback, bandit orchestrator 301 can update machine learning model 304 to increase a likelihood of recommending the particular content for targets in that age range. In some embodiments, the machine learning model 304 can be configured to use at least one of the feedback value, the context, the recommended template, or the recommendation identifier to update a data structure for the indicated contextual bandit, as described above.

In step 410, bandit orchestrator 301 can construct another email message using another template recommended by the updated machine learning model 304 for another context. This second template may be the same as, or different than, the first template. For example, bandit orchestrator 301 can receive another target identifier and a context obtained for the identified target, and the bandit orchestrator 301 can provide this context to updated machine learning model 304. Updated machine learning model 304 can generate a recommended template based on the context, which can be used to construct another email message. The constructed email can be provided to the target.

Figure 5:
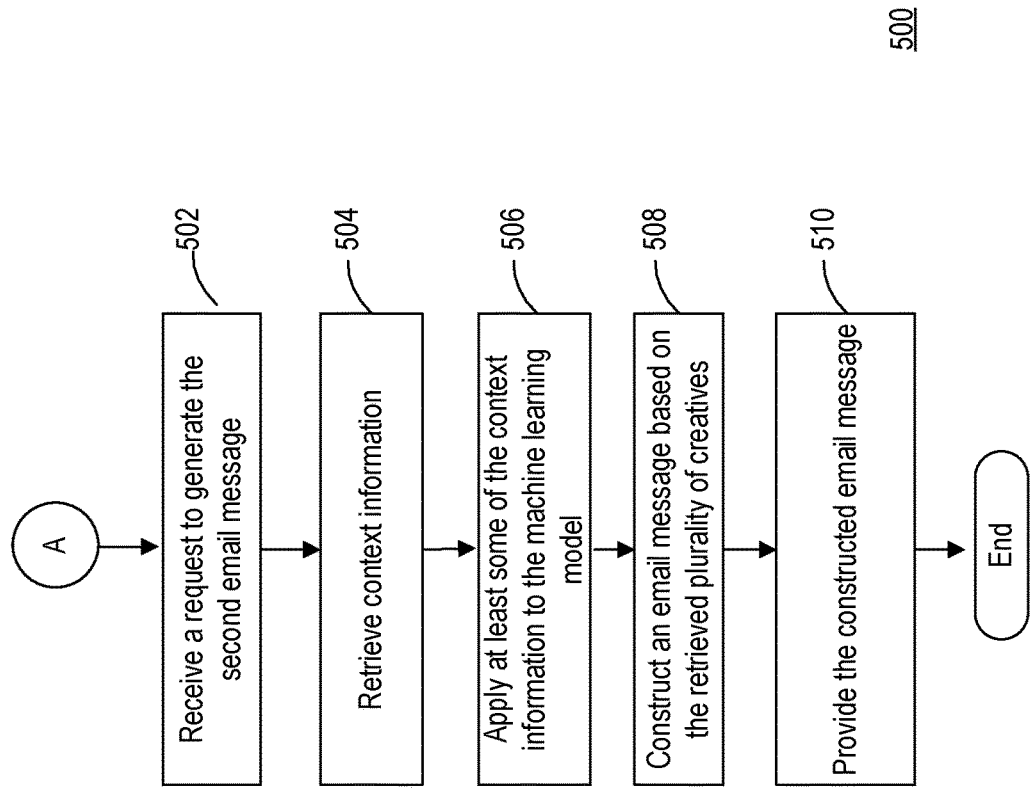
FIG. 5 depicts an exemplary flow chart of an exemplary recommendation process, consistent with disclosed embodiments.

FIG. 5 depicts an exemplary flow chart of an exemplary recommendation process 500, consistent with disclosed embodiments. In some embodiments, exemplary process 500 can be executed by a bandit orchestrator 301.

In step 502, bandit orchestrator 301 can receive from orchestrator 306 a request to generate an email message. The request can include an identifier of a machine learning model 304 and an identifier of a target. The identifier of machine learning model 304 can identify a particular machine learning model. This particular machine learning model can be associated with a population comprising targets. System 300 can use the machine learning model to determine which email template is used to construct the email to each target.

In step 504, bandit orchestrator 301 can retrieve information for a target from database 303 by using an identifier of the target. For example, bandit orchestrator 301 can transmit an identifier of a target to database 303 to retrieve information for a target. The retrieved information can include personal information and interaction information. The personal information can include at least one of income information, financial account information, credit report information, or employment information. The personal information can further include demographic information in some embodiments. The interaction information can include information concerning previous interactions with an entity. For example, the previous interactions can include responses to prior marketing campaigns, product inquiries, etc. In some embodiments, bandit orchestrator 301 can retrieve, using a machine learning model identifier, a campaign definition that specifies the at least a portion of the information applied to the machine learning model 304.

In step 506, system 301 may apply at least a portion of the retrieved context information to machine learning model 304 associated with an identifier of the machine learning model 304 to generate a template recommendation. The portion of the retrieved context information may include descriptive data related to a target and model 304 can generate a template recommendation based on the portion.

In step 508, bandit orchestrator 301 can construct an email message with the generated template recommendation. Bandit orchestrator 301 can retrieve, from metadata service 307, a template using the generated template recommendation. Bandit orchestrator 301 can then construct the email message using the retrieved template.

In step 510, bandit orchestrator 301 can also provide the constructed email message to orchestrator 306. Orchestrator 306 can be configured to transmit the email message to the target. Bandit orchestrator 301 can also store feedback data associated with the constructed email message in a delay buffer 305 with a negative feedback value and a delay time.

Figure 6:
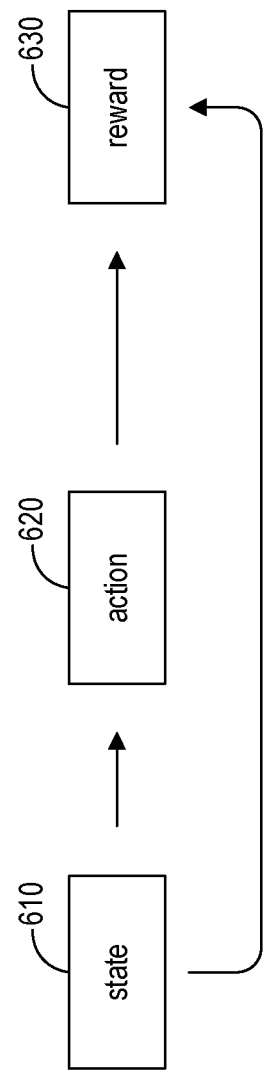
FIG. 6 depicts an exemplary finite state machine diagram showing the updating of a contextual bandit model, consistent with disclosed embodiments.

FIG. 6 depicts an exemplary finite state machine diagram showing the updating of a contextual bandit model, consistent with disclosed embodiments. Contextual bandit 600 can include a state 610 an action 620 and a reward 630. Contextual bandit 600 can be configured to learn a policy for selecting actions in a state. The policy can be learned to maximize an expected reward in a state, Here, contextual bandits 600 (e.g., machine learning model 304) can communicate with bandit orchestrator 301 to learn from feedback data (e.g., reward 630 is greater when a link in an email is selected than when the email is ignored or an unsubscribe message is received) and recommend the best template for generating an email based on the context.

Figure 7:
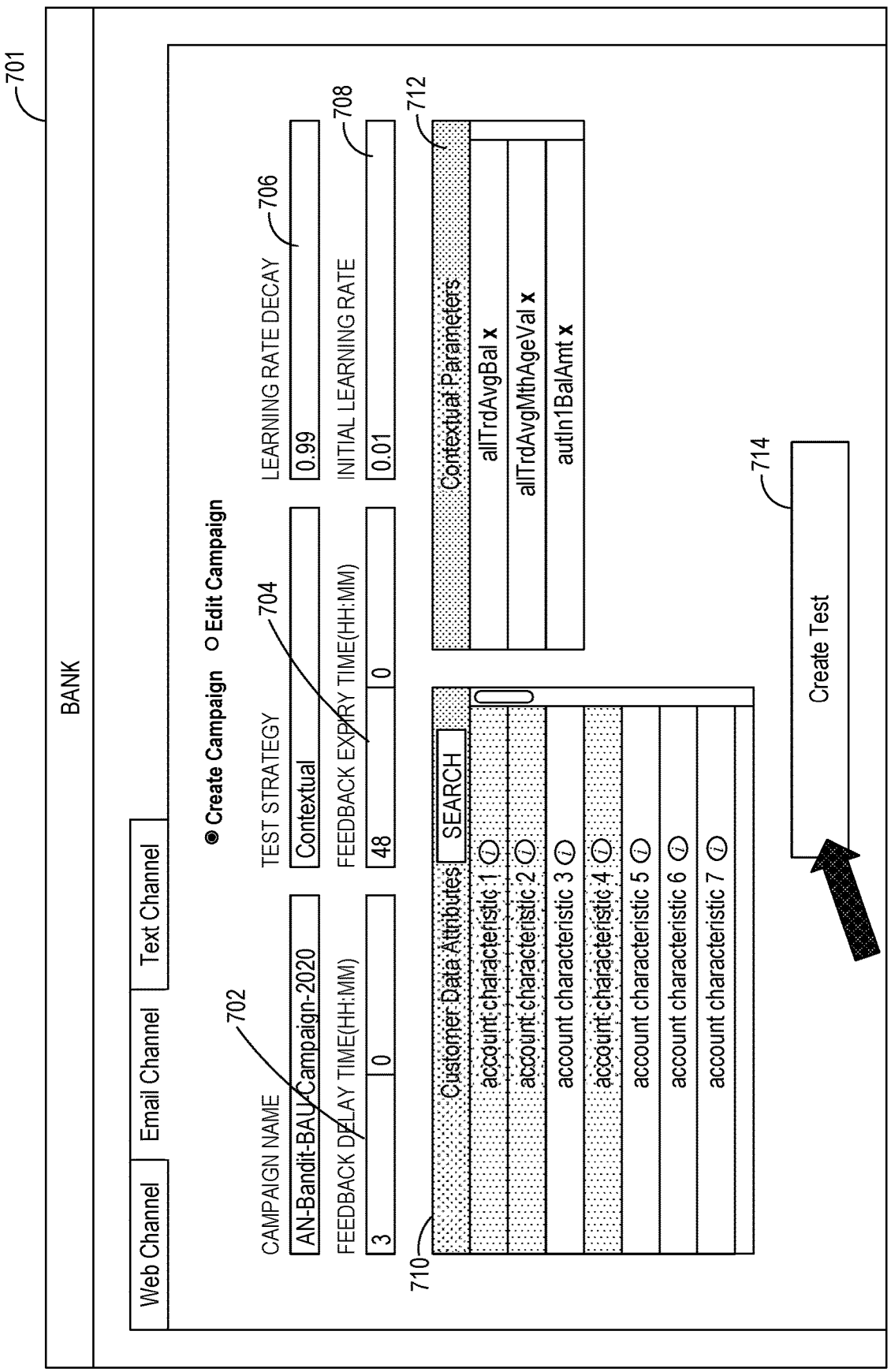
FIG. 7 depicts an exemplary interface for creating an email campaign, consistent with disclosed embodiments.

FIG. 7 depicts an exemplary interface for creating an email campaign, consistent with disclosed embodiments. This interface can be displayed on a display of computer system 100, mobile device 136, or another suitable device. As shown in FIG. 7, a user may enter a "Create Campaign" interface 701 of an online self-serve tool and may select a "Email Channel" tab. Other tabs relating to an "Web Channel" and "Text Channel" are shown in FIG. 7. The disclosed embodiments are not intended to be limited to the interface disclosed in FIG. 7.

Interface 701 can include control 702 (labeled "FEEDBACK DELAY TIME"), control 704 (labeled "FEEDBACK EXPIRY TIME"), control 706 (labeled "LEARNING RATE DECAY"), control 708 (labeled "INITIAL LEARNING RATE"), control 710 (labeled "Customer Data Attributes"), control 712 (labeled "Contextual Parameters") and control 714 (labeled "Create Test"). While controls 702 to 708 are shown as entry fields, such controls may be realized using drop-down menus, radio buttons, or other suitable controls. Similarly, while controls 710 and 712 are shown as multi-selection boxes, any other suitable control may be used. Controls 702 to 712 can enable a user to configure parameters of the contextual bandit and the context used to select an email template. Control 714 can be selected to continue with configuration of the email campaign.

In some embodiments, control 702 can enable configuration of a delay time, as discussed above with respect to FIGS. 3 and 4. A user may interact with control 702 to set the delay time for processing feedback data. For example, feedback data stored delay buffer 305 can be stored for a time dependent on a configurable value associated with control 702. In some instances, bandit orchestrator 301 can retrieve feedback data from delay buffer 305 when a delay time equal to this configurable value has elapsed. In some instances, such a delay time can be measured from mailing of an email message associated with the feedback data.

In some embodiments, control 704 can enable configuration of an expiration time for updating a feedback value in delay buffer 305. A user may interact with control 704 to set this expiration time for updating a feedback value. For example, a feedback value may not be updated when a feedback indication is received from feedback system 302 after the expiration time has passed. The expiration time can be measured from mailing of an email message associated with the feedback data.

In some embodiments, control 706 can enable configuration of a parameter used in the training of machine learning model 304. The parameter can include the range between 0.0 and 1.0. The parameter can control how quickly the machine learning model 304 is adapted to unlearn old learnings. A user may interact with control 706 to set an unlearning rate to control a learning process of machine learning model 304.

In some embodiments, control 708 can enable configuration of an initial learning rate parameter used in the training of machine learning model 304. The parameter can include the range between 0.0 and 1.0. The initial learning rate parameter can control how quickly the machine learning model 304 is adapted to learn based on feedback data. A high learning rate can cause the machine learning model 304 to converge too quickly to a suboptimal solution and a low learning rate can cause the process to flounder. A user may interact with control 708 to set an initial learning rate to control a learning process of machine learning model 304.

In some embodiments, control 710 can enable a user to select parameters for inclusion in the context used to recommend an email template. As shown, control 710 can include a list of items of available information regarding targets of the email campaign, described above with respect to FIGS. 3 and 5. Such items can include account or user population characteristics, user relationship characteristics, and the like. An indication can be provided of the selected items (e.g., shading of selected items). In some embodiments, control 712 can indicate the context (e.g., the items of available information selected for use in recommending an email template). A user can interact with control 710 (e.g. by selecting items in the displayed list) to add items of the available information to the context or remove items from the context. In some embodiments, after receiving a press on control 714, another interface can be displayed, such as the interface depicted in FIG. 8.

FIG. 8 depicts an exemplary interface 801 for configuring a contextual bandit for use with an email campaign, consistent with disclosed embodiments. Interface 801 includes a control 802. A user may interact with control 802 to generate another interface, such as the interface depicted in FIG. 9. The exemplary interface 801 can be displayed by computer 100, mobile device 136, or another suitable device. The disclosed embodiments are not intended to be limited to the interface disclosed in FIG. 8.

Figure 9:
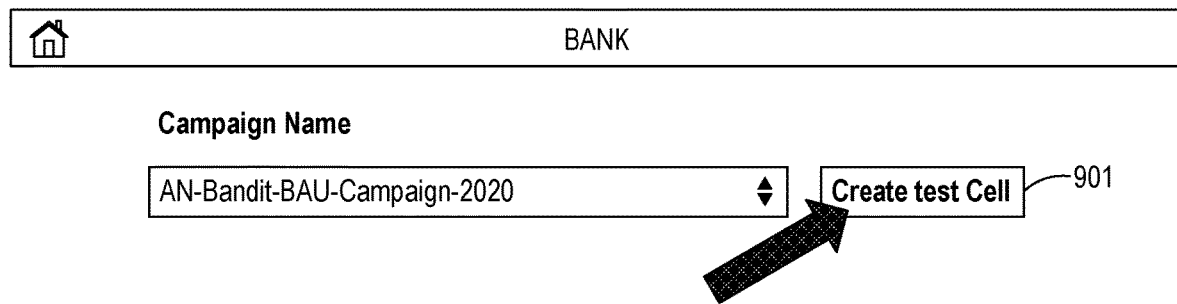
FIG. 9 depicts an exemplary interface for selecting a template recommendation for further editing, consistent with disclosed embodiments.

FIG. 9 depicts an exemplary interface 900 for configuring a contextual bandit for use with an email campaign, consistent with disclosed embodiments. Interface 900 includes a control 901. A user can interact with control 901 to generate a template recommendation. The generated template recommendation may be used to construct an email message. The exemplary interface 900 can be displayed by computer 100, mobile device 136, or another suitable device. The disclosed embodiments are not intended to be limited to the interface disclosed in FIG. 9.

Figure 10:
FIG. 10 depicts an exemplary interface for constructing an email message using a template recommendation, consistent with disclosed embodiments.

FIG. 10 depicts an exemplary interface 1000 for constructing an email message using a template recommendation, consistent with disclosed embodiments. Interface 1000 may include a template 1002 which has been generated by using the template recommendation (e.g., a preview of the template). Template 1002 may include controls enabling a user to set the values of variables affecting the email message generated using the template. As described herein, these variables and values can be stored in metadata service 307. Interface 1000 display these variables and their values. In some embodiments, in response to selection of control 1004, system 300 may construct an email message by using an exemplary template 1002 and all template variables. In some embodiments, system 300 may also generate another interface, such as the interface 1100 depicted in FIG. 11. The exemplary interface 1100 can be displayed by computer 100, mobile device 136, or another suitable device. The disclosed embodiments are not intended to be limited to the interface disclosed in FIG. 10.

Figure 11:
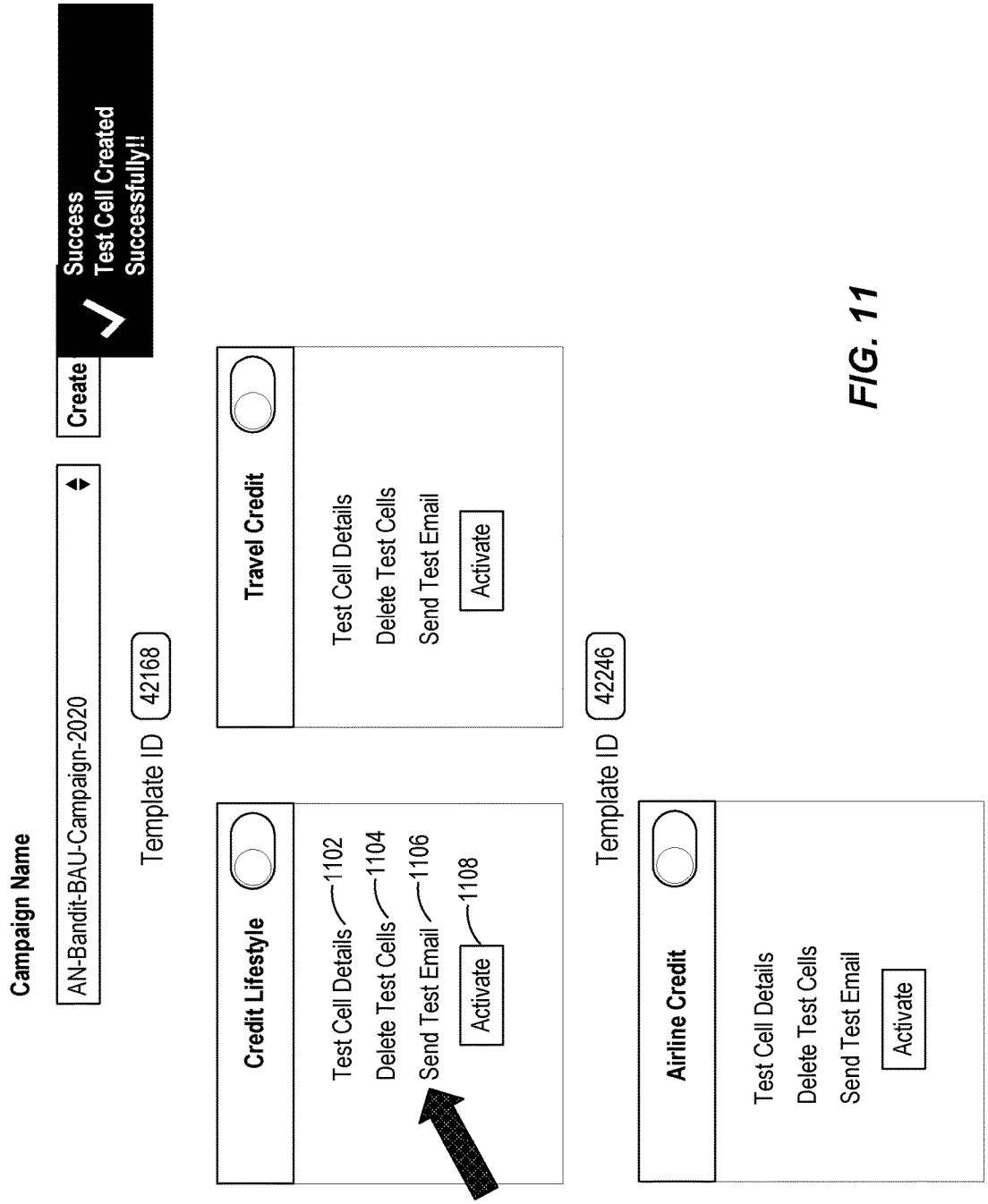
FIG. 11 depicts an exemplary interface for interacting with email campaigns, consistent with disclosed embodiments.

FIG. 11 depicts an exemplary interface 1100 for interacting with email campaigns, consistent with disclosed embodiments. As shown, interface 1100 can include panels corresponding to different email templates (e.g., "Credit Lifestyle", "Travel Credit", and "Airline Credit" in the non-limiting example shown). The panels can include controls, such as Test Cell Details control 1102, Delete Test Cells control 1104, Send Test Email control 1106, and activate control 1108. A user can interact with Test Cell Details control 1102 to open an interface for modifying template variables or variable values (e.g., exemplary interface 1000). A user can interact with Delete Test Cells control 1104 to delete the email template. A user can interact with Send Test Email control 1106 to construct a test email message for an inspection. Activate control 1108, when selected, can create a template and enable machine learning model 304 to process the template as described in steps from FIGS. 3 and 4. The exemplary interface 1100 can be displayed by computer 100, mobile device 136, or another suitable device. The disclosed embodiments are not intended to be limited to the interface disclosed in FIG. 11.

Figure 12A:
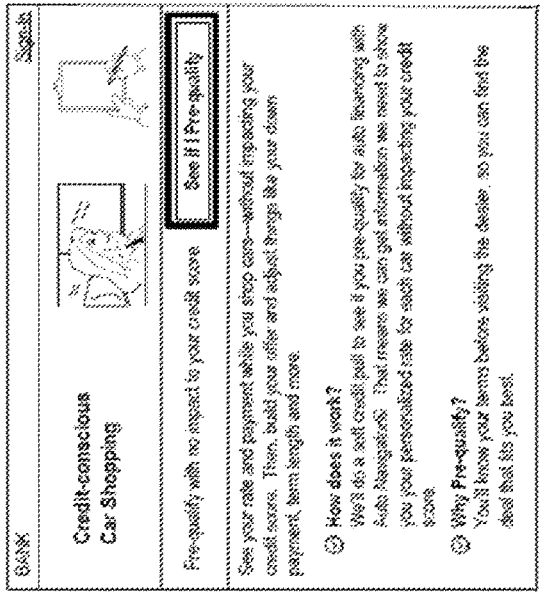
FIGS. 12A-12C depict views of an exemplary email message, constructed consistent with disclosed embodiments.
Figure 12B:
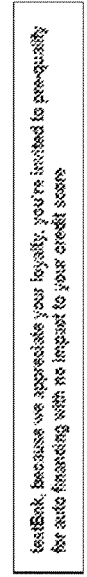
Figure 12C:
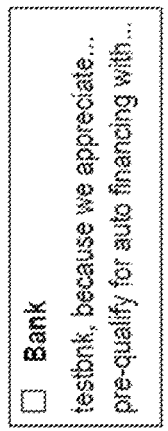

FIG. 12A depicts an exemplary constructed email message. FIG. 12B depicts a corresponding subject line for the message of 12A. FIG. 12C depicts how the message of FIG. 12A may appear in an inbox of a user.

FIG. 13 depicts an exemplary interface 1300 for modifying a value of a variable in a template associated with an email campaign, consistent with disclosed embodiments. Interface 1300 may include control 1302 and control 1304. A user may interact with control 1302 to update modifications made on a template variable, or may interact with control 1304 to cancel the modifications. The exemplary interface 1300 can be displayed by computer 100, mobile device 136, or another suitable device. The disclosed embodiments are not intended to be limited to the interface disclosed in FIG. 13.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A system comprising:
at least one memory containing instructions; and
at least one processor configured to execute the instructions to perform operations comprising:
receiving a feedback indication concerning an email message sent to a target, the email message constructed using a first template and associated with a first context, the feedback indication including a recommendation identifier;
updating, in response to receiving the feedback indication, a feedback value for the email message stored in a delay buffer;
obtaining the updated feedback value upon satisfaction of a time delay condition;
updating, using the updated feedback value and the recommendation identifier, a machine learning model configured to recommend templates based on contexts; and
constructing and providing a second email message using a second template recommended by the updated machine learning model for a second context.

2. The system of claim 1, wherein the feedback indication indicates selection of a link in the email message.

3. The system of claim 1, wherein the first context includes descriptive data for a first target and interaction data for the first target.

4. The system of claim 1, wherein updating a feedback value further comprises changing a negative feedback value into a positive feedback value.

5. The system of claim 1, wherein the time delay condition is satisfied when a time less than seven days has elapsed since mailing of the email message.

6. The system of claim 1, wherein the time delay condition is satisfied when a time between 8 and 30 hours has elapsed since mailing of the email message.

7. The system of claim 1, wherein the machine learning model is updated to increase a probability of recommending the first template based on the first context.

8. The system of claim 1, wherein the machine learning model is a contextual bandit model.

9. The system of claim 1, wherein constructing and providing the second email message further comprises:
   receiving a request to generate the second email message, the request including an identifier of the machine learning model and an identifier of a second target;
   retrieving, from at least one database, information for the second target, using the identifier of the second target;
   applying at least a portion of the information to the machine learning model to generate a template recommendation;
   constructing the second email message using the template recommendation; and
   providing the constructed second email message.

10. The system of claim 9, wherein constructing the second email message using the template recommendation further comprises retrieving, from a database storing a set of templates, the second template using the template recommendation.

11. The system of claim of 9, wherein the operations further comprise retrieving, using the machine learning model identifier, a campaign definition that specifies the at least a portion of the information applied to the machine learning model.

12. The system of claim 9, wherein the operations further comprise storing a negative feedback value for the second email message in the delay buffer with a delay time.

13. The system of claim 12, wherein the negative feedback value is stored in the delay buffer in response to receiving a delivery indication for the email.

14. A system comprising:
   at least one memory containing instructions; and
   at least one processor configured to execute the instructions to perform operations comprising:
      receiving a request to generate an email message, the request including an identifier of a machine learning model and an identifier of a target;
      retrieving, from at least one database, information for the target, using the identifier of the target;
      applying at least a portion of the information to the identified machine learning model to generate a template recommendation;
      constructing the email message using the template recommendation;
      storing a negative feedback value for the email message in a delay buffer with a delay time; and
      providing the constructed email message.

15. The system of claim 14, wherein the machine learning model is a contextual bandit model.

16. The system of claim 14, wherein the operations further comprise retrieving, using the machine learning model identifier, a campaign definition that specifies the at least a portion of the information applied to the machine learning model.

17. The system of claim 14, wherein the delay time is between 8 and 30 hours.

18. The system of claim 14, wherein the operations further comprise:
   receiving a feedback indication concerning the email message; and
   updating, in response to receiving the feedback indication, the negative feedback value for the email message in the delay buffer to a positive feedback value.

19. The system of claim 18, where in the operations further comprise:
   updating the machine learning model using the positive feedback value; and
   constructing and providing a second email message using the updated machine learning model.

20. A non-transitory computer readable medium containing instructions that, when executed by at least one processor of a system, cause the system to perform operations comprising:
   receiving a feedback indication concerning an email message sent to a target, the email message constructed using a first template and associated with a first context, the feedback indication including a recommendation identifier;
   updating, in response to receiving the feedback indication, a feedback value for the email message stored in a delay buffer;
   obtaining the updated feedback value upon satisfaction of a time delay condition;
   updating, using the updated feedback data and the recommendation identifier, a machine learning model configured to recommend templates based on contexts; and
   constructing and providing a second email message using a second template recommended by the updated machine learning model for a second context.

* * * * *